United States Patent
Ashton et al.

(10) Patent No.: US 7,443,629 B1
(45) Date of Patent: Oct. 28, 2008

(54) APPARATUS, SYSTEM, AND METHOD FOR OPTIMIZING FAST ACCESS DATA STORAGE ON SEGMENTED TAPE MEDIA

(75) Inventors: Lyn Lequam Ashton, Tucson, AZ (US); Erika Marianna Dawson, Tucson, AZ (US); Lisa Joan Gundy, Tucson, AZ (US); Stanley Mark Kissinger, Tucson, AZ (US); Michael Ray Noel, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/697,832

(22) Filed: Apr. 9, 2007

(51) Int. Cl.
*G11B 15/46* (2006.01)
(52) U.S. Cl. .................................. 360/73.04
(58) Field of Classification Search ............. 360/73.04, 360/69, 71, 72.2, 73.05, 73.06, 73.08, 77.12, 360/72.1; 369/1; 386/55, 77, 38, 117
See application file for complete search history.

(56) References Cited

U.S. PATENT DOCUMENTS

| | | | | |
|---|---|---|---|---|
| 3,723,666 A | * | 3/1973 | Ferrari ........................ | 360/72.1 |
| 3,885,756 A | * | 5/1975 | Uehara et al. ............. | 242/332.2 |
| 3,906,169 A | * | 9/1975 | Iwase et al. .................... | 369/1 |
| 4,139,867 A | * | 2/1979 | Foerster ........................ | 386/77 |
| 4,300,735 A | * | 11/1981 | Ichikawa .................. | 242/356.4 |
| 4,316,224 A | * | 2/1982 | Hansen et al. ............. | 360/72.2 |
| 4,571,674 A | | 2/1986 | Hartung ...................... | 364/200 |
| 4,584,613 A | * | 4/1986 | Amari et al. ................... | 386/38 |
| 5,182,677 A | * | 1/1993 | Kizu et al. .................... | 386/55 |
| 5,526,133 A | * | 6/1996 | Paff ........................... | 386/117 |
| 5,892,633 A | | 4/1999 | Ayres et al. .............. | 360/73.08 |
| 6,502,178 B1 | | 12/2002 | Olbrich ....................... | 711/202 |
| 2002/0007366 A1 | | 1/2002 | Fontijn ....................... | 707/205 |
| 2005/0050263 A1 | | 3/2005 | Ashton et al. ................. | 711/111 |
| 2005/0102330 A1 | | 5/2005 | Beeston et al. ............. | 707/204 |
| 2006/0080500 A1 | | 4/2006 | Manthey et al. ............. | 711/111 |

* cited by examiner

*Primary Examiner*—Fred Tzeng
(74) *Attorney, Agent, or Firm*—Kunzler & McKenzie (57) ABSTRACT

A method is disclosed for optimizing fast access data storage on segmented tape media. The apparatus, in one embodiment, is configured to selectively write data to a tape storage medium. The selection module may select data for storage as one of fast access and slower access. Fast access data may be stored on the first segment, or fast access portion, of a tape storage medium to provide optimal speed for data retrieval. Slower access data may be stored on the remaining available storage space of the tape storage medium. Additionally, read requests for fast access data may be accessed more quickly than read requests for slower access data. Thus, user data may be selected and written to a tape storage medium relative to a preferred access time.

11 Claims, 7 Drawing Sheets

APPARATUS, SYSTEM, AND METHOD FOR OPTIMIZING FAST ACCESS DATA STORAGE ON SEGMENTED TAPE MEDIA

BACKGROUND OF THE INVENTION

1. Field of the Invention

This invention relates to tape storage media and more particularly relates to apparatuses, systems, and methods for managing data storage on segmented tape media to maximize use of available storage capacity and to optimize fast access to stored data.

2. Description of the Related Art

With each new generation of tape storage technology, the capacity of available tape storage products increases in response to the general demand for greater storage capabilities. The total storage capacity of a tape depends on many factors, including the physical dimensions of the tape, the data compression, if any, used to write data to the tape, the number of tracks across the width of the tape, and so forth. Furthermore, the usable storage capacity is often defined to be slightly less than the physical capacity of the tape media. This is due, in part, to servo tracks, data block headers, and other metadata blocks existing throughout the tape.

For tape storage applications, a tape drive typically enables data to be stored onto a magnetic tape medium, such as a metallic ribbon, within a tape cartridge. The tape medium conventionally is designed to include a plurality of tracks that are distributed across the physical width of the tape medium and run the physical length of the tape medium. A tape write head within the tape drive is typically capable of writing up to about sixteen tracks at one time, starting at one end of the tape and moving along the length of the tape. When the tape write head reaches the end of the tape, the head is aligned over the proximate track set, the direction of the tape is reversed, and the write head writes an additional sixteen tracks in the opposite direction. This "serpentine" pattern may continue until all tracks have been written.

The process for reading data from the tape medium is essentially the same. A tape read head moves across the tape medium and reads sixteen tracks from one end of the tape medium to the other. The tape read head then realigns to read an additional sixteen tracks and moves over the second set of tracks in the opposite direction.

Given the large capacity of conventional tape storage devices, various data blocks may be stored on a single tape medium. The location of each of these data blocks may be marked on the tape using block header information, data pads (areas of tape where data is intentionally not written), and other conventional identification means and methods. The tape read head is able to locate a particular block of data by using one or more servo tracks that are written onto the tape storage medium.

As the total tape storage capacity increases, however, so too does the time required to access data on the tape media. Because of the physical length of the tape and the increased number of bits on the tape, the amount of time required to fulfill a read request typically varies depending on the location of the data stored on the tape. Faster data access is generally available for data stored near the front of the tape, while data stored near the end of the tape typically requires a longer access time to scroll through the length of the tape.

In certain time-sensitive applications, delayed data access can cause negative effects and may impede subsequent read requests or other processes. These effects can cause Service Level Agreements to be missed. However, for many other data storage uses, such as data backup, for example, the infrequent need to access that data makes longer access times generally acceptable.

More recently, manufacturers of tape storage products have directed their attention in part to improving data access time using tape storage drives and cartridges. One method to address the problem of increased data access time employs various levels of transparent buffering in which tape data may be stored in connection with other storage mediums, such as a direct access storage device (DASD) or an optical disk.

If the requested tape data is stored on a DASD cache as with a virtual tape subsystem, data retrieval time may be improved greatly. However, the storage capacity of a DASD cache is typically significantly less than that of a tape storage system. Currently, technology allows about five hundred Gigabytes (GB) of non-compacted data to be stored on a single, standard tape cartridge. The previous generation of tape media provided for a storage capacity of about three hundred GB. In addition, the DASD cache must migrate much of the data to tape cartridges in order to be able to buffer more recent data. For this reason, a DASD cache only improves data retrieval time for the data that is in the DASD cache at the time of the data request, but does not improve the access time for the large portion of data that has been migrated to tape and demoted from the cache.

Another known method of decreasing data access time is to segment the tape storage medium into two or more segments and to write data to the segments in a sequential manner. A tape segment may include a specified storage capacity, or a physical length of tape, that is less than the total capacity of the tape. For example, a tape storage medium may be divided into two segments. When writing data to the tape, the data is written to the first segment, which may facilitate fast access, and then to the second segment, which typically requires slower access. This method improves data access time in that the first segment may be written to or read from without physically forwarding all the way to the end of the tape storage medium. Data access time is greatly improved when the first segment is located at the load point of the tape.

The first segment may include, for example, about one fifth of the total tape storage capacity. Thus, the tape drive need only advance one fifth of the way through the total length of the tape medium, rather than all the way to the physical end of the tape, before reversing direction. The data stored on the first segment generally can be accessed quicker than data distributed along the entire length of the tape.

In certain embodiments, the tape is ended after the first segment is filled. However, limiting the storage capacity of the tape negates one of the greatest advantages provided by tape storage media. Providing segmented tape media optimizes the data storage capacity and yet at the same time allows fast access for retrieving data in the first segment.

When storing data to the entire length of the segmented tape, determining or selecting data for fast access can be problematic and even counterproductive in certain instances. Because data can be written to the second segment of the tape only after the first segment of the tape has been filled, storage to the fast access portion of the tape must be carefully monitored to ensure that slower access data is not stored to the fast access portion. In addition, accessing data stored on the first segment of the tape may be hindered or slowed by a read request for data stored on the second segment of the tape, thereby minimizing the advantages of providing fast access storage.

From the foregoing discussion, it should be apparent that a need exists for an apparatus, system, and method that enables fast access to data stored on tape media while further enabling utilization of the large storage capacity of the tape. Beneficially, such an apparatus, system, and method would determine whether data requires fast access and would store the selected data on the fast access portion of the tape media. Furthermore, the apparatus, system, and method would enable storage on the slower access portion of the tape media for data storage uses not requiring fast access.

SUMMARY OF THE INVENTION

The present invention has been developed in response to the present state of the art, and in particular, in response to the problems and needs in the art that have not yet been fully solved by currently available tape storage media and tape storage systems. Accordingly, the present invention has been developed to provide an apparatus, system, and method for optimizing fast access data storage on segmented tape media that overcome many or all of the above-discussed shortcomings in the art.

The apparatus, in one embodiment, is configured to selectively write data to a tape storage medium to optimize fast access to that selected data. To reduce the amount of storage capacity wasted for "fast access" performance preferences, the present invention enables fast access data to be written to the fast access segment of a tape storage medium and further enables slower access data to be written to the remaining portion of the tape storage medium without slowing read requests for fast access data. The apparatus may include a selection module, a write module, a read module, a tracking module, and a segmentation module.

The selection module selects data for storage as one of fast access and slower access. Fast access data storage may provide optimal data retrieval and efficiency for selected data, while slower access data storage may enable data retrieval at or below optimal retrieval levels. In certain embodiments, identifying data as "fast access" provides a parameter and/or an indicator that the data is to be stored on a first segment of a tape storage medium. Similarly, identifying data as "slower access" permits the data to be stored on the subsequent segments of a tape storage medium, allowing fast access data to have priority to the first segment of the tape storage medium. The selection module beneficially enables the data to be stored relative to a preferred access time.

The apparatus is further configured, in one embodiment, to prioritize a read request for fast access data over a read request for slower access data. In certain embodiments, the read module executes a read request for data selected for fast access before executing a read request for data selected for slower access. In other embodiments, consideration may also be given to the slower access requests so that they are not excessively delayed. Thus, the read module optimizes accessing fast access data.

In a further embodiment, the apparatus may be configured to track data storage on the tape storage medium and to determine the storage capacity remaining on the first segment and the second segment of the tape storage medium. In certain embodiments, the tracking module determines whether the remaining storage capacity is sufficient to store fast access data on the first segment of the tape storage medium and slower access data on the second segment of the tape storage medium. In one embodiment, sufficient means that the complete data must reside in the fast access segment, and in other embodiments, it may be sufficient for a piece of the data to reside in the fast access segment with the rest of the data then spilling over to the slower access segment.

A system of the present invention is also presented to selectively write data to a tape storage medium to optimize fast access data storage. The system may be embodied in a tape storage system. In particular, the system, in one embodiment, includes a tape drive unit, a tape storage medium, a host computer, a segmentation module, a selection module, a write module, a read module, and a tracking module. The tape storage system enables data storage and retrieval, optimizing fast access for selected data.

A method of the present invention is also presented for selectively writing data to a tape storage medium. The method in the disclosed embodiments substantially includes the steps necessary to carry out the functions presented above with respect to the operation of the described apparatus and system. In one embodiment, the method includes selecting data for storage as one of fast access and slower access, writing data selected for fast access on a first segment of the tape storage medium, and writing data selected for slower access on the remaining available storage space of the tape storage medium. In certain embodiments, the data selected for slower access is written on the first, or faster access, segment of the tape storage medium.

In a further embodiment, the method includes executing a read request for fast access data before executing a read request for slower access data. In one embodiment, a read request for fast access or slower access data may be determined relative to the location of the data on the tape storage medium. In such an embodiment, for example, a read request for data stored on the first segment may be processed before a read request for data located on the second segment of the tape storage medium; thereby minimizing the time required to complete the request for the fast access data.

In yet another embodiment, the method includes tracking data storage on the tape storage medium and determining the storage capacity remaining on the first segment and the second segment of the tape storage medium. As a result, the fast access data may be stored to a tape storage medium with sufficient storage capacity remaining on the first segment, or fast access portion. In addition, the slower access data may be stored on a tape storage medium with sufficient storage capacity, yet located to minimize wasted fast access storage space.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables fast access to data stored on tape storage media while further enabling utilization of the large storage capacity of the tape. The apparatus, system, and method determine whether data requires fast access and stores the selected data on the fast access portion of the tape media. In addition, the apparatus, system, and method enable storage on the slower access portion of the tape media for data storage uses not requiring fast access. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of generating a signal, causing a signal to be generated, or causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
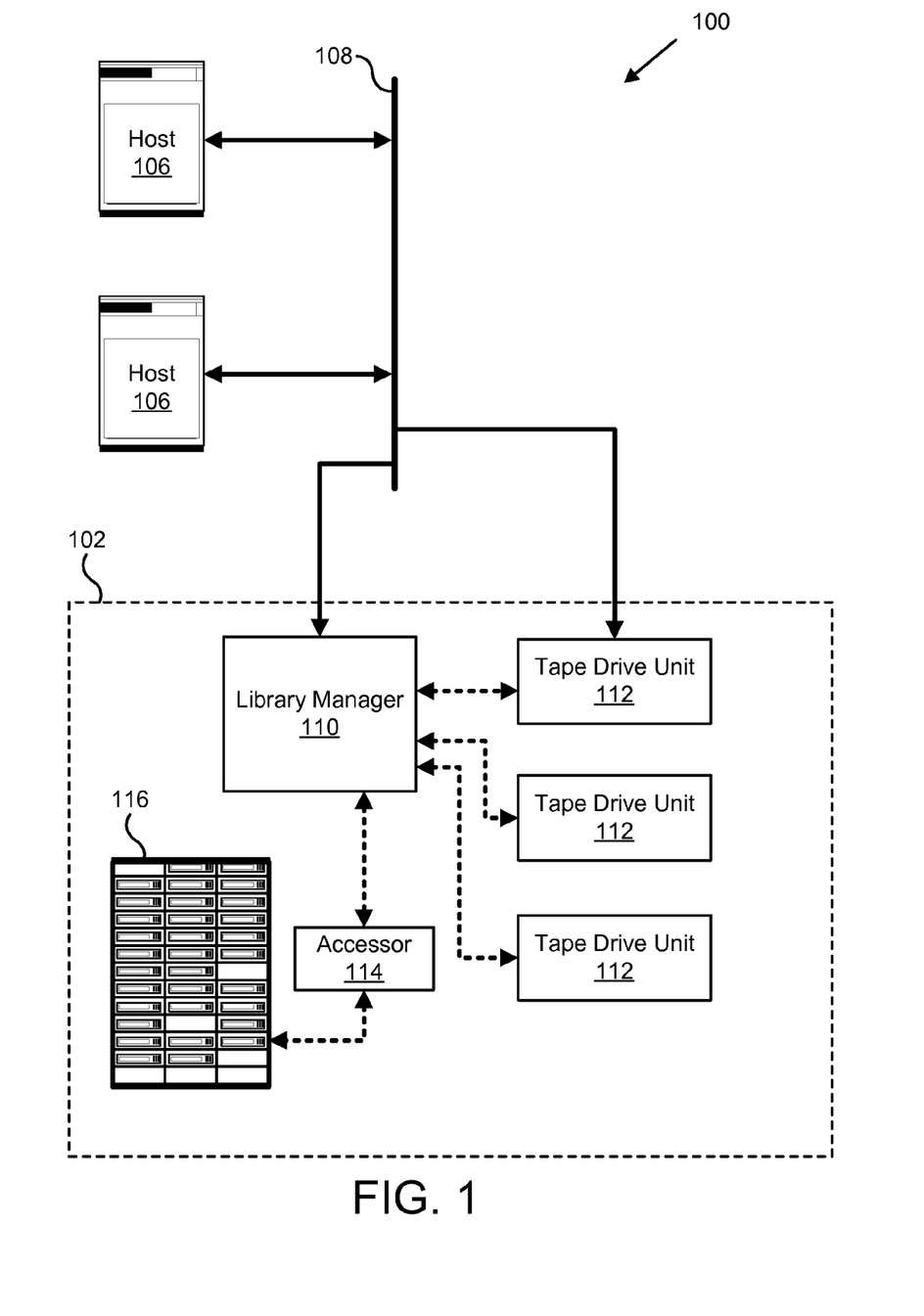
FIG. 1 is a schematic block diagram illustrating one embodiment of a tape storage system in accordance with the present invention.

FIG. 1 depicts a schematic block diagram of one embodiment of a tape storage system 100 that may be employed in accordance with the present invention. The tape storage system 100 shown includes an automated tape library unit 102 and at least one host 106. Each host 106 may be a mainframe computer. Alternatively, the host 106 may be a server or personal computer using one of a variety of operating systems. The host 106 is connected via a storage area network (SAN) or similar communication channel 108. Alternatively, the host 106 may be connected directly to a tape drive unit 112. The communication channel 108, in one embodiment, may be a FICON or ESCON.

The illustrated automated tape library unit 102 includes a library manager 110, one or more tape drive units 112, an accessor 114, and a plurality of tape storage media cartridges 116. The plurality of tape storage cartridges 116 may be stored in one or more media cartridge storage bins (not identified).

The library manager 110, which may include a computing processor (not shown), is interconnected with and controls the actions of the tape drive units 112 and the accessor 114. The library manager 110 also may include one or more hard disk drives (not shown) for memory storage, as well as, a control panel or keyboard (not shown) to provide user input. The control panel may be, in one embodiment, a computer in communication with the library manager 110 so that a user can control the operating parameters of the automated tape library unit 102 independently of the host 106.

In FIG. 1, three tape drive units 112 are shown. The present invention is operable with one or any larger number of tape drive units 112. The tape drive units 112 may share one single repository of tape storage cartridges 116. Alternatively, the tape drive units 112 may independently correspond to and utilize multiple repositories of tape storage cartridges 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the depicted library manager 110 transmits and receives control signals to the tape drive units 112 and the accessor 114. Data for storage or retrieval may be transmitted directly between the host 106 and the tape drive units 112 via a communication channel 108, which may be a storage area network (SAN), a local area network (LAN), a wide area network (WAN), or a different type of network, such as the ESCON, FICON, the Internet or a direct connection between the host 106 and the tape drive devices 112.

The accessor 114 may be a robotic arm or other mechanical device configured to transport the selected tape storage cartridges 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 116. In alternative embodiments, the tape drive units 112 may be replaced by optical disk drives or other magnetic drives. Similarly, the tape storage cartridges 116 may be replaced by other storage media cartridges 116 utilizing magnetic media, optical media, or any other removable media corresponding to the type of drive employed.

Figure 2:
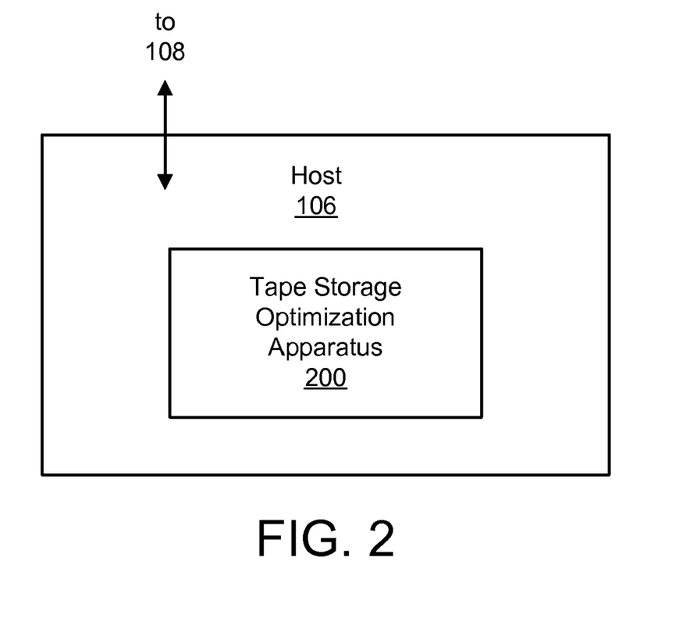
FIG. 2 is a schematic block diagram illustrating one embodiment of a tape storage optimization apparatus in accordance with the present invention.

FIG. 2 illustrates one embodiment of a tape storage optimization apparatus 200 in accordance with the present invention. In one embodiment, the tape storage optimization apparatus 200 is implemented within the host 106. In another embodiment, the tape storage optimization apparatus 200 may be implemented within a library manager 110 or individual tape drive 112.

The tape storage optimization apparatus 200 facilitates determining where to store data on a tape storage medium in order to enable fast access to selected data while utilizing the large storage capacity of the tape storage medium. In certain embodiments, utilizing tape segmentation facilitates providing fast access storage. As mentioned above, segmentation of tape media allows for faster data access because the tape drive heads may traverse a segment of a lengthy tape more quickly than the whole length of the tape. Accordingly, because tapes are read sequentially from start to end, the first segment provides faster access to data stored thereon. One or more subsequent segments provide additional storage capacity, but have longer data access times. In certain embodiments, the first segment of the tape storage medium may be used exclusively without writing data to subsequent segments to preserve the tape as fast access only.

Figure 3:
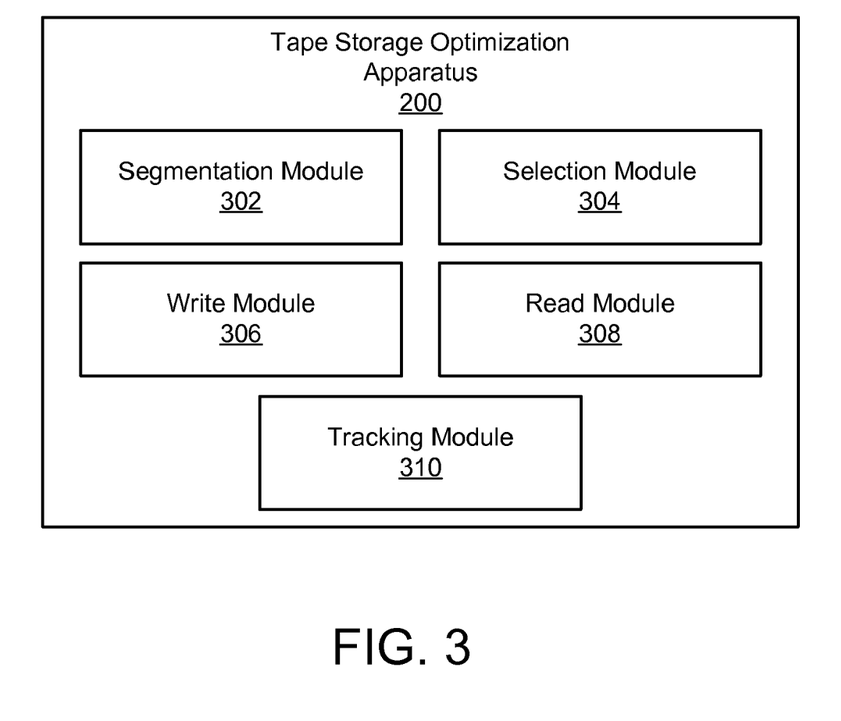
FIG. 3 is a schematic block diagram illustrating one embodiment of a tape storage optimization apparatus in accordance with the present invention.

FIG. 3 depicts one embodiment of a tape storage optimization apparatus 200 that includes a segmentation module 302, a selection module 304, a write module 306, a read module 308, and a tracking module 310. The tape storage optimization apparatus 200 may track the size, the location on the tape media, and the designation or identification of the data stored on the tape storage medium as either fast access or slower access. In certain embodiments, the tape storage optimization apparatus 200 is policy based and may be integrated into a storage management system (SMS).

In one embodiment, the segmentation module 302 is configured to recognize a first and second segment on a tape storage medium. In a further embodiment, the segmentation module 302 is configured to divide a tape storage medium into multiple segments, such as a first segment and a second segment. This segmentation may be done automatically by the tape drive unit 112, for example, or may occur in response to a user input specifying a user-defined segmentation layout. Furthermore, the capacity of the first and second segments may be defined according to historical data access information and performance criteria.

The selection module 304 is configured to select data for storage as one of fast access and slower access. In certain embodiments, the user may select or determine the access designation, such as at the time of a write request, for example. In an alternative embodiment, the selection may occur automatically according to certain criteria, such as a file type, an application, or the like. In one embodiment, an identifier to identify the data as one of fast access and slower access is provided.

The write module 306 writes data from a host 106 to a tape storage medium on a tape storage cartridge 116. In addition, the write module 306 may be configured to write data selected for fast access on the first segment of the tape storage medium and to write data selected for slower access on the remaining available storage space.

The read module 308 reads data from a tape storage medium on a tape storage cartridge 116 and sends the retrieved data to a host 106. In a further embodiment, the read module is configured to execute a read request for data selected for fast access before executing a read request for data stored on the slower access segment.

The tracking module 310 tracks data storage on the tape storage medium. In addition, the tracking module 310 may determine the storage capacity remaining on the first segment and the second segment of the tape storage medium. In certain embodiments, the tracking module 310 further determines whether sufficient storage capacity remains on the first segment of the tape storage medium to store data selected for fast access. Furthermore, the tracking module 310 may determine whether sufficient storage capacity is available on the second segment of the tape storage medium to store data selected for slower access.

Figure 4:
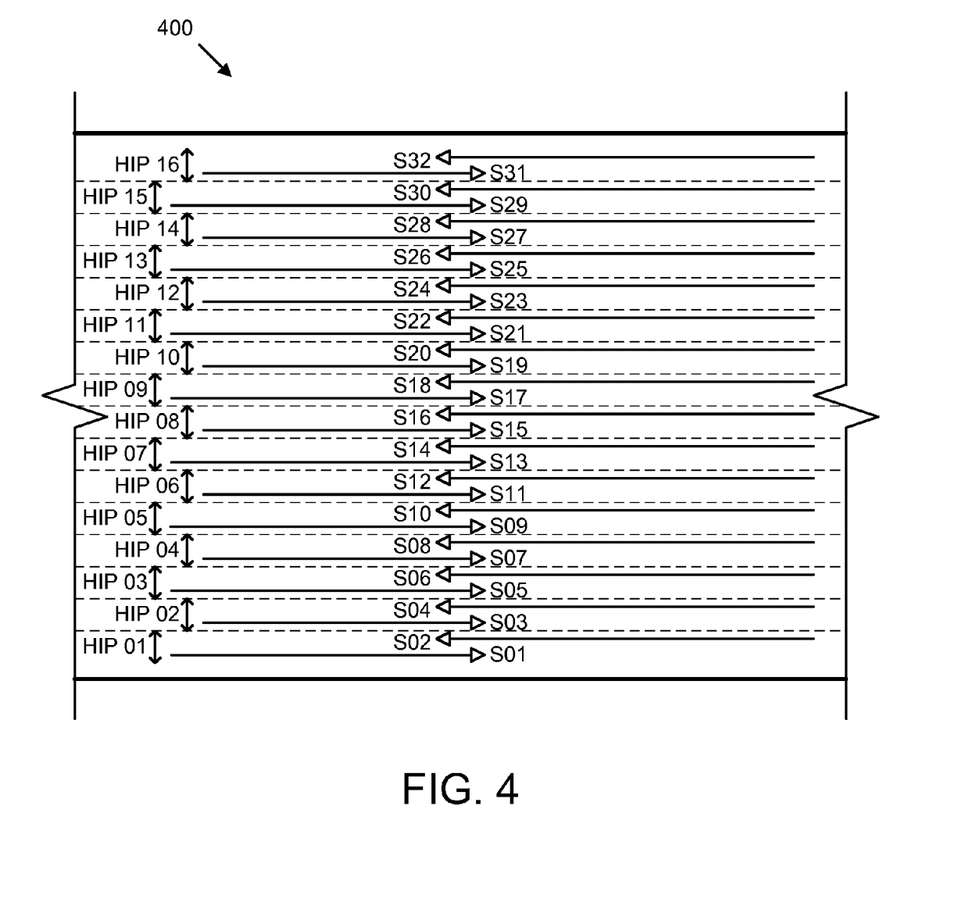
FIG. 4 is a schematic diagram illustrating one embodiment of a serpentine recording pattern on a section of a tape storage medium in accordance with the present invention.

FIG. 4 depicts one embodiment of a section of tape storage medium 400 that may be used to store data within a tape storage cartridge 116 described above. The illustrated tape storage medium 400 is formatted with serpentine recording path and is divided into sixteen head index positions (HIPs). In a further embodiment, the tape storage medium 400 may be formatted for interleaved longitudinal recording or another recording technique.

In one embodiment, each head index position (HIP) includes 32 tracks that are divided into two sets of sixteen tracks each. On a metal particle tape storage medium 400 that is approximately 12.7 mm [0.5"], for example, existing technology allows 512 tracks of data (32 tracks for each of sixteen head index positions). In this way, using the proper tape drive unit 112, sixteen tracks of data may be written or read at the same time with a single pass of a read or write head, respectively, over the tape storage medium 400.

For example, a write head (not shown) may begin writing data to the track set "S01" within the head index position "HIP 01" at the beginning of the tape storage medium 400 and write approximately to the physical end of the tape storage medium 400. The write head may then pass in the opposite direction over the track set "S02," still within the head index position "HIP 01," and write data to the proximate sixteen tracks over the entire length of the tape storage medium 400. In a single round trip, data may be written over 32 tracks within a single head index position (HIP). In one embodiment, existing technology employs a tape storage medium 400 that is approximately 580 m [1902.9 ft] in length and may store as much as 300 GB of non-compacted data.

Figure 5:
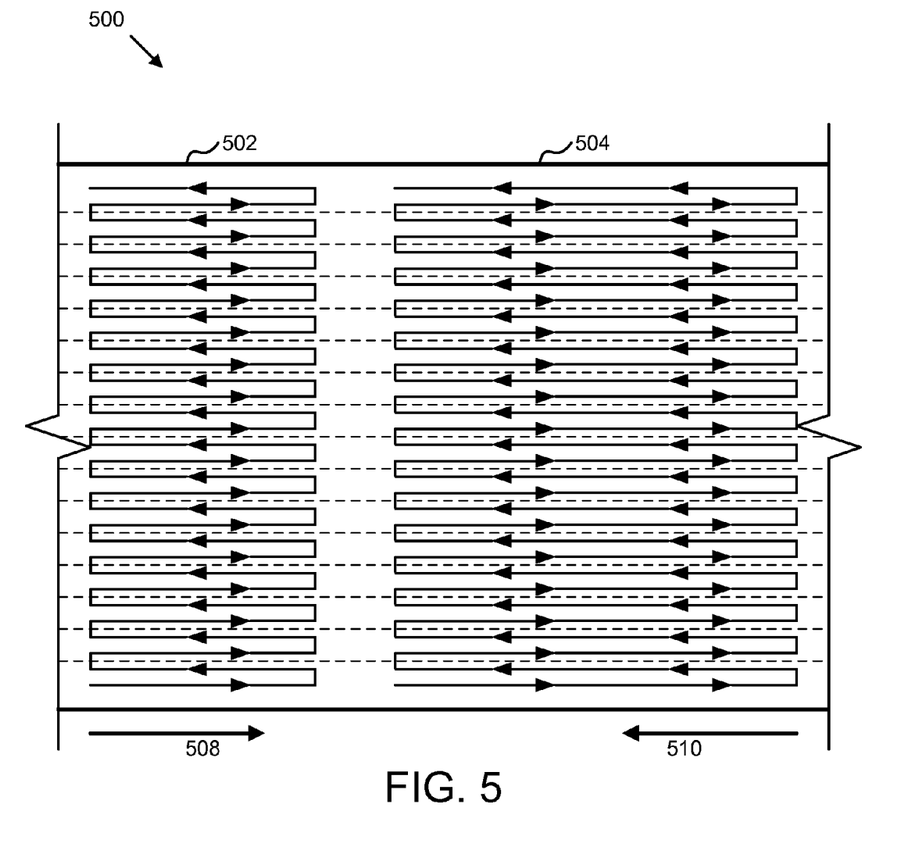
FIG. 5 is a schematic diagram illustrating one embodiment of a section of a segmented tape storage medium in accordance with the present invention.

FIG. 5 depicts one embodiment of a section of tape storage medium 500 that is similar to the tape storage medium 400 shown in FIG. 4. However, the tape storage medium 500 of FIG. 5 is segmented into two segments, a first segment 502 and a second segment 504. In one embodiment, for example, which uses a tape storage medium 500 with a total capacity of 300 GB, the tape storage medium 500 may be segmented into a first segment 502 of approximately 60 GB and a second segment 504 of 200 GB.

The depicted tape storage medium 500 shows the serpentine recording paths within the first and second segments 502, 504. For example, in the first segment 502, data may be recorded on the track set "S01" in a forward direction and then on the track set "S02" in a reverse direction 510 back to the beginning of the tape storage medium. Data may then be recorded on the track set "S03" in the forward direction 508 and on the track set "S04" in the reverse direction 510. This recording pattern may continue until the entire first segment 502 contains data. Data may then be recorded beginning on track set "S01" in the second segment 504 until the end of the tape storage medium 500. Data may then be recorded on the track set "S02" within the second segment 504. This recording pattern likewise may continue until the entire second segment 504 contains data.

Figure 6:
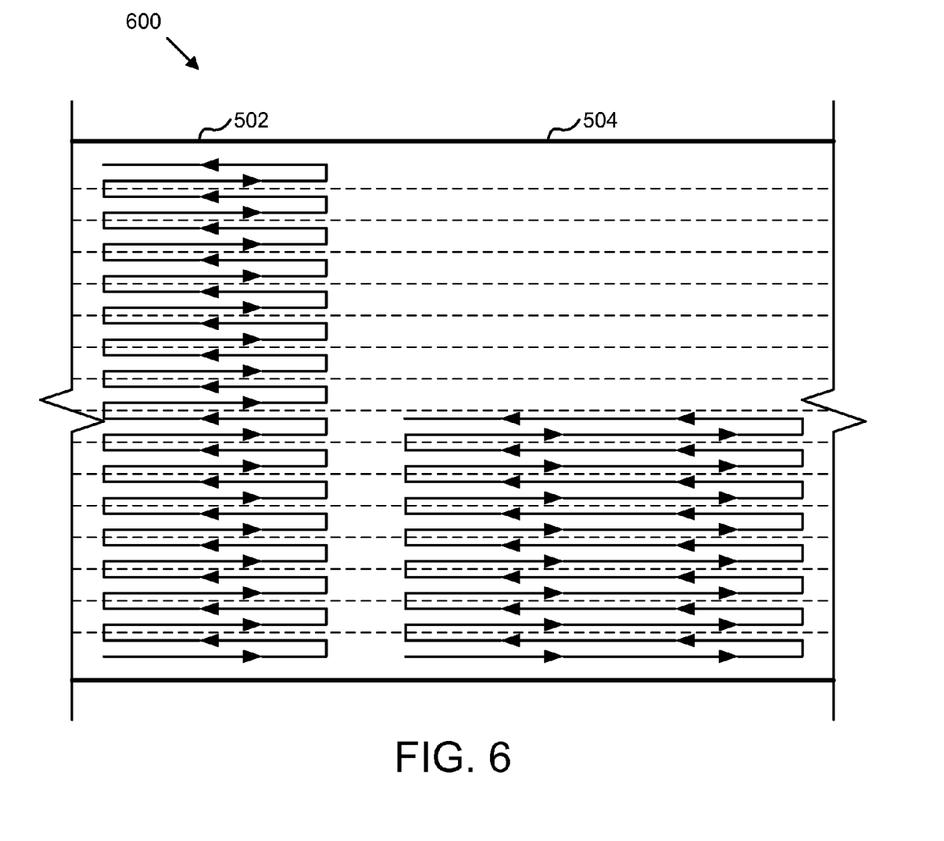
FIG. 6 is a schematic diagram illustrating an alternative embodiment of a section of segmented tape storage medium in accordance with the present invention.

In an alternative embodiment, data may be written to only a portion of the first segment 502 and/or a portion of the second segment 504. As shown in FIG. 6, the first segment 502 of a tape storage medium 600 may be fully written while the second segment 504 may be only partially written through the track sets "S01" through "S16," for example; though the first segment 502 must be populated before data can be written to the second segment 504.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
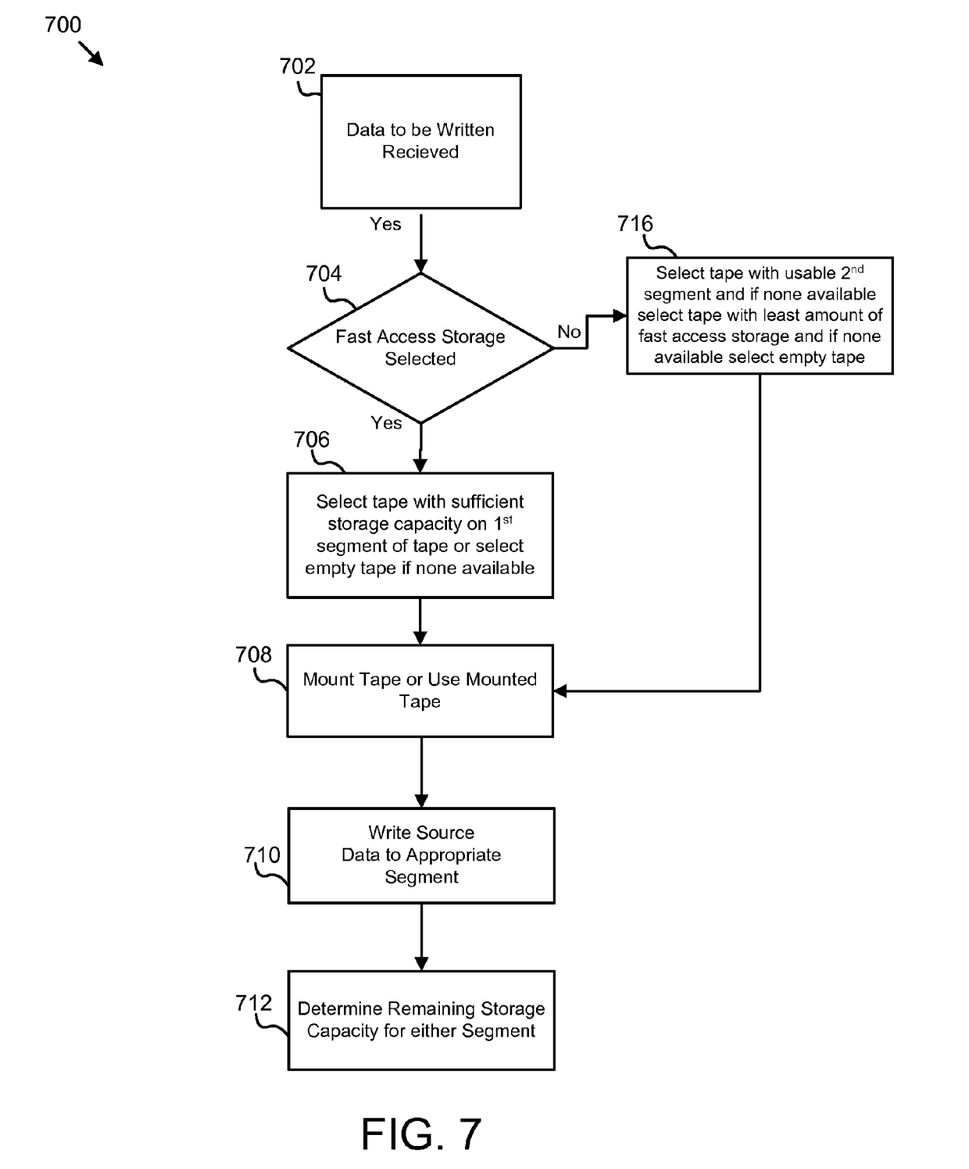
FIG. 7 is a schematic flow chart diagram illustrating one embodiment of a selective data storage process in accordance with the present invention.

FIG. 7 depicts one embodiment of a selection process 700 for selecting data as one of fast access and slower access and selectively writing the data to a tape storage medium to optimize fast access data storage. The depicted selection process 700 begins when a write request is made and the source data is received 702. The process then determines 704 if fast access storage is selected. If so, a tape storage cartridge 116 is selected 706 and, if necessary, mounted 708. If an existing tape contains sufficient storage capacity on a first segment, the tape is selected. If no existing tapes contain sufficient capacity, an empty tape is selected. In select embodiments, the tape storage cartridge 116 is located within the automated tape library unit 102.

The user may employ a host computer 106, in one embodiment, to access a tape management application that is configured to manage the plurality of tape storage cartridges 116 within the automated tape library unit 102. In a further embodiment, the user may employ the library manager 110 within the automated tape library unit 102. In one embodiment, the user accesses a parameter selection application within the tape management application that allows the user to input user-defined parameters. For example, parameters for defining 704 data as either fast access or slower access may be established. Alternatively, the user may directly select 704 data for fast access storage. The selection module 304 may facilitate selecting 704 data for fast access storage.

If fast access storage is selected 704, the segmentation module 302 may determine if the tape is segmented and may segment the tape if needed. In addition, the segmentation module 302 may further check for historical data access information and performance criteria.

The source data is written 710 to the appropriate segment, and the tracking module 310 may then determine 712 whether sufficient storage capacity is available on the first segment of the tape storage medium. In the depicted embodiment, to assure fast access data retrieval, the data selected for fast access is written 710 on the first segment of the tape storage medium. The tracking module 310 may further determine the remaining storage capacity on the first and second segments of the tape. Then the tape may be demounted in select embodiments.

If the storage capacity on the first segment is insufficient, another tape may be selected 706. In one embodiment, selection process 700 determines and selects a tape that has the least amount of free space available on the first segment, but enough storage capacity to store the data, thereby conserving and managing the available tape storage media for optimal use. Tape media may be selected based on characteristics supplied to host storage management software in certain embodiments.

If the data is not selected for storage as fast access, the tracking module 310 may determine 716 whether the selected tape storage cartridge 116 has sufficient storage capacity to store the data on the second segment of the tape. If the first segment has not been filled or the second segment has insufficient storage space, the selection process 700 may determine whether another tape is available that has adequate storage capacity on the second segment of the tape storage medium.

Again, in one embodiment, the selection process 700 identifies a tape with the least amount of storage space available on the second segment, but with sufficient storage capacity to store the data. The slower access data may subsequently be written 710 to the second segment, or slower access portion, of the tape storage medium.

In the event that no available tape cartridge 116 has sufficient space available on the second segment, the slower access data may be written 710 to the first segment of the tape storage medium and if there is no available tape cartridge with sufficient space available on the first segment, an empty tape is selected. Thus, the process 700 gives priority for storage on the first segment of the tape storage medium to data selected for fast access storage. Subsequently, the selection process 700 ends.

Figure 8:
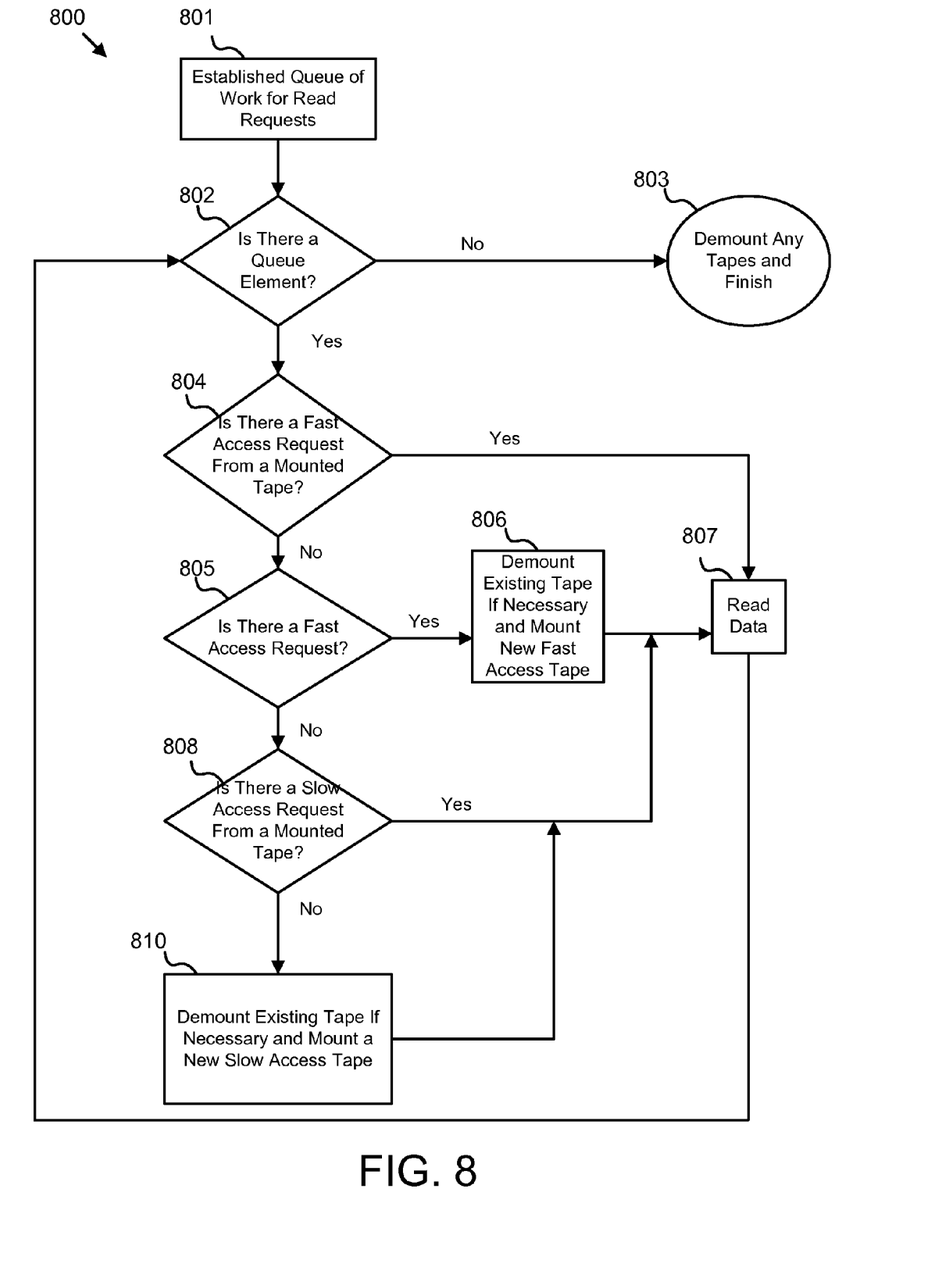
FIG. 8 is a schematic flow chart diagram illustrating one embodiment of a selective data retrieval process in accordance with the present invention.

FIG. 8 illustrates one embodiment of a data retrieval process 800 in accordance with the present invention. The data retrieval process 800 optimizes read requests in a selected order. In one embodiment, this order comprises 1) fast access reads from currently mounted media; 2) fast access reads; 3) slow access reads from currently mounted media; and 4) slow access reads.

The retrieval process 800 begins by establishing 801 a queue of read requests. At a step 802, the process 800 determines if there is a queue element. If not, the tapes are demounted 803 and the process 800 ends. At a step 804, the process 800 determines if there is a fast access request from a mounted tape. If so, the process 800 reads 807 the tape and returns to step 802 to determine if there are further queue elements.

If there is not a fast access request from a mounted tape, the system 800 checks 805 to see if there is another fast access request in the queue of work. If there is, the existing tape is demounted, and a new fast access tape is mounted. The data on the newly mounted fast access tape is then read 807, and the process 800 proceeds back to step 802.

If the determination at step 805 is negative, the process 800 proceeds to step 808, where it determines whether there is a slow access request from a mounted tape. If so, the data is read 807, and the process returns to step 802. If not, the existing tape is demounted 810 if necessary, and a new slow access tape is mounted. The data is then read 807, and the process returns to step 802.

Requested data is identified as one of fast access or slower access. In one embodiment, the location of the data on the tape storage medium facilitates determining fast access designation. Alternatively or in addition, an identifier may be associated with the data to identify the data as either fast access or slower access.

If the read request is for fast access data, the tape storage cartridge 116 may already be mounted 804 and the data may be read 807 from the first segment of the tape storage medium. Subsequently, another read request may be processed 802. Alternatively, the tape storage cartridge 116 may be demounted 806. The retrieval process 800 prioritizes read requests for fast access data over read requests for slower access data. Thus, the fast access data is retrieved quicker than data that is not designated for fast access. In addition, requests for slower access data do not impede retrieval of fast access data.

When slower access data is requested, the retrieval process 800 may check 804 for a read request for fast access data before accessing the data designated for slower access. If a request for fast access data is detected, the process 800 may defer 808 the read request for slower access data until any or all of the requests for fast access data are fulfilled. If fast access data is not requested, the process 800 may mount 810 the corresponding tape storage cartridge 116 and read 807 the requested slower access data. When there are no more active requests for data, the retrieval process 800 ends.

The retrieval process 800 facilitates minimizing the access time to retrieve data selected for fast access. In addition, access to slower access data may be blocked until all fast access data requests have been fulfilled. As a result, segmented tapes may be used for fast access data storage without wasting the additional storage capacity of the tape. Data accessed less-frequently may consequently be written to the tail end of "fast access" tapes. Thus, fast access data retrieval is enabled without diminishing the storage capacity of the tape storage system 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer readable medium having computer usable program code programmed for selectively writing data to a tape storage medium to optimize fast access data storage, the computer usable program code executable to perform operations comprising:
   selecting data for storage as one of fast access and slower access;
   writing data selected for fast access on a first segment of the tape storage medium; and
   writing data selected for slower access on the remaining available storage space of the tape storage medium.

2. The computer readable medium of claim 1, wherein the tape storage medium is segmented and comprises a first segment configured to provide fast access data storage and a second segment configured to provide slower access data storage.

3. The computer readable medium of claim 2, further comprising writing data selected for slower access on the second segment of the tape storage medium.

4. The computer readable medium of claim 2, further comprising tracking the amount of data written on the tape storage medium and determining the storage capacity remaining on the first segment and the second segment of the tape storage medium.

5. The computer readable medium of claim 4, further comprising determining whether the remaining storage capacity on the first segment of the tape storage medium is sufficient to store data selected for fast access.

6. The computer readable medium of claim 4, further comprising determining whether the remaining storage capacity on the second segment of the tape storage medium is sufficient to store data selected for slower access.

7. The computer readable medium of claim 1, further comprising executing a read request for data selected for fast access before executing a read request for data selected for slower access.

8. The computer readable medium of claim 1, further comprising providing an identifier to identify the data as one of fast access and slower access.

9. A method for selectively writing data to a tape storage medium, the method comprising:
   selecting data for storage as one of fast access and slower access;
   writing data selected for fast access on a first segment of the tape storage medium; and
   writing data selected for slower access on the remaining portion of the tape storage medium.

10. The method of claim 9, further comprising executing a read request for data selected for fast access before executing a read request for data selected for slower access.

11. The method of claim 9, further comprising tracking data storage on the tape storage medium, determining whether the remaining storage capacity on a second segment of the tape storage medium is sufficient to store data selected for slower access, and storing the data selected for slower access on the first segment of a second tape storage medium when the remaining storage capacity of the second segment of a first tape storage medium is insufficient.

\* \* \* \* \*